(12) United States Patent
Ray et al.

(10) Patent No.: US 7,986,589 B2
(45) Date of Patent: Jul. 26, 2011

(54) APPARATUS FOR SEISMIC DATA ACQUISITION

(75) Inventors: Clifford H. Ray, Fulshear, TX (US);
Glenn D. Fisseler, Houston, TX (US);
Hal B. Haygood, Sugar Land, TX (US)

(73) Assignee: Fairfield Industries Incorporated, Sugar Land, TX (US)

( * ) Notice: Subject to any disclaimer, the term of this patent is extended or adjusted under 35 U.S.C. 154(b) by 0 days.

(21) Appl. No.: 12/547,478

(22) Filed: Aug. 25, 2009

(65) Prior Publication Data
US 2010/0039892 A1 Feb. 18, 2010

Related U.S. Application Data

(62) Division of application No. 12/220,518, filed on Jul. 25, 2008, now Pat. No. 7,668,047, which is a division of application No. 10/766,253, filed on Jan. 28, 2004, now Pat. No. 7,561,493.

(51) Int. Cl.
*G01V 1/00* (2006.01)

(52) U.S. Cl. ............. 367/76; 367/77; 367/178; 367/188

(58) Field of Classification Search ............. 367/76, 367/77, 178, 188
See application file for complete search history.

(56) References Cited

U.S. PATENT DOCUMENTS

| | | |
|---|---|---|
| 3,297,982 A | 1/1967 | Allan |
| 4,144,520 A | 3/1979 | McNeel |
| 4,281,403 A | 7/1981 | Siems et al. |
| 4,300,220 A | 11/1981 | Goff et al. |
| 4,380,059 A | 4/1983 | Ruehle |
| 4,422,164 A | 12/1983 | Bowden et al. |
| 4,458,339 A | 7/1984 | Wason |
| 4,462,094 A | 7/1984 | Bowden et al. |
| 4,486,865 A | 12/1984 | Ruehle |
| 4,525,819 A | 6/1985 | Hefer |
| 4,613,821 A * | 9/1986 | Sternberg et al. ............. 324/323 |
| 4,666,338 A | 5/1987 | Schoepf |

(Continued)

FOREIGN PATENT DOCUMENTS

GB   2275337 A   8/1994

(Continued)

OTHER PUBLICATIONS

Seabed Geophysical AS, "Case, CAble-less SEIsmic System," 8 pages, SeaBed Geophysical AS, Trondheim/Norway.

(Continued)

*Primary Examiner* — Mark Hellner
(74) *Attorney, Agent, or Firm* — Haynes and Boone, LLP

(57) ABSTRACT

A seismic exploration method and unit comprised of continuous recording, self-contained wireless seismometer units or pods. The self-contained unit may include a tilt meter, a compass and a mechanically gimbaled clock platform. Upon retrieval, seismic data recorded by the unit can be extracted and the unit can be charged, tested, re-synchronized, and operation can be re-initiated without the need to open the unit's case. The unit may include an additional geophone to mechanically vibrate the unit to gauge the degree of coupling between the unit and the earth. The unit may correct seismic data for the effects of crystal aging arising from the clock. Deployment location of the unit may be determined tracking linear and angular acceleration from an initial position. The unit may utilize multiple geophones angularly oriented to one another in order to redundantly measure seismic activity in a particular plane.

21 Claims, 2 Drawing Sheets

U.S. PATENT DOCUMENTS

| | | | |
|---|---|---|---|
| 4,692,906 A | 9/1987 | Neely | |
| 4,813,029 A | 3/1989 | Erich et al. | |
| 4,839,872 A | 6/1989 | Gragnolati | |
| 4,849,947 A | 7/1989 | Baule et al. | |
| 4,884,248 A | 11/1989 | Laster et al. | |
| 4,979,150 A | 12/1990 | Barr | |
| 5,003,517 A | 3/1991 | Greer | |
| 5,010,531 A | 4/1991 | McNeel | |
| 5,067,112 A | 11/1991 | Meek | |
| 5,119,345 A | 6/1992 | Woo et al. | |
| 5,138,538 A | 8/1992 | Sperling | |
| 5,163,028 A | 11/1992 | Barr et al. | |
| 5,189,642 A * | 2/1993 | Donoho et al. | 367/15 |
| 5,191,526 A | 3/1993 | Laster et al. | |
| 5,214,614 A | 5/1993 | Baule | |
| 5,231,252 A | 7/1993 | Sansone | |
| 5,253,223 A | 10/1993 | Svenning | |
| 5,274,605 A | 12/1993 | Hill | |
| 5,365,492 A | 11/1994 | Dragoset et al. | |
| 5,432,895 A | 7/1995 | Myers | |
| 5,469,408 A | 11/1995 | Woo | |
| 5,500,832 A | 3/1996 | Berryhill | |
| 5,548,562 A | 8/1996 | Helgerud | |
| 5,550,786 A | 8/1996 | Allen | |
| 5,623,455 A | 4/1997 | Norris | |
| 5,624,207 A | 4/1997 | Berges | |
| 5,655,753 A | 8/1997 | Berges | |
| 5,671,344 A | 9/1997 | Stark | |
| 5,724,241 A * | 3/1998 | Wood et al. | 702/14 |
| 5,761,152 A | 6/1998 | Jacobsen et al. | |
| 5,774,417 A | 6/1998 | Corrigan et al. | |
| 5,902,072 A | 5/1999 | Berges | |
| 5,930,730 A | 7/1999 | Marfurt et al. | |
| 6,002,640 A * | 12/1999 | Harmon | 367/38 |
| 6,012,018 A | 1/2000 | Hornbuckle | |
| 6,021,090 A | 2/2000 | Gaiser et al. | |
| 6,024,344 A | 2/2000 | Buckley et al. | |
| 6,049,507 A | 4/2000 | Allen | |
| 6,070,129 A | 5/2000 | Grouffal et al. | |
| 6,101,448 A | 8/2000 | Ikelle et al. | |
| 6,141,622 A | 10/2000 | Keller et al. | |
| 6,151,556 A | 11/2000 | Allen | |
| 6,208,247 B1 * | 3/2001 | Agre et al. | 340/539.19 |
| 6,215,499 B1 | 4/2001 | Neff et al. | |
| 6,292,754 B1 | 9/2001 | Thomsen | |
| 6,307,808 B1 | 10/2001 | Schmidt | |
| 6,314,371 B1 | 11/2001 | Monk | |
| 6,353,577 B1 * | 3/2002 | Orban et al. | 367/43 |
| 6,366,537 B1 | 4/2002 | Sambuelli et al. | |
| 6,430,105 B1 * | 8/2002 | Stephen | 367/15 |
| 6,532,190 B2 | 3/2003 | Bachrach | |
| 6,584,406 B1 | 6/2003 | Harmon et al. | |
| 6,607,050 B2 | 8/2003 | He et al. | |
| 6,657,921 B1 | 12/2003 | Ambs | |
| 6,738,715 B2 | 5/2004 | Shatilo et al. | |
| 6,751,162 B2 | 6/2004 | Dominguez et al. | |
| 6,791,901 B1 | 9/2004 | Robertson et al. | |
| 6,814,179 B2 | 11/2004 | Corrigan et al. | |
| 6,816,434 B2 | 11/2004 | Jones | |
| 6,850,462 B2 | 2/2005 | McDaniel et al. | |
| 6,912,903 B2 | 7/2005 | Hamblen et al. | |
| 6,934,219 B2 | 8/2005 | Burkholder | |
| 6,977,867 B2 | 12/2005 | Chamberlin | |
| 7,016,260 B2 | 3/2006 | Bary | |
| 7,021,146 B2 | 4/2006 | Nash et al. | |
| 7,085,196 B2 | 8/2006 | Nemeth | |
| 7,324,406 B2 | 1/2008 | Berg | |
| 2004/0073373 A1 | 4/2004 | Wilson | |
| 2005/0144795 A1 | 7/2005 | Tanner | |
| 2005/0246137 A1 | 11/2005 | Brinkman et al. | |

FOREIGN PATENT DOCUMENTS

| | | |
|---|---|---|
| WO | 9710461 | 9/1996 |
| WO | 0237140 A2 | 5/2002 |

OTHER PUBLICATIONS

Geopro GMBH, "WARRP Offshore," 2 pages, GeoPro GmbH, Hamburg/Germany, Mar. 2002.

Dr. Thomas Buttgenbach, Klaus Schleisiek, "4-C System Goes Ultradeep," 3 pages, Hart's E&P, Houston, Texas/United States of America, Jan. 2002.

Thales Underwater Systems, "Reservoir Monitoring Solutions," 18 pages, Thales, Jan. 2003.

* cited by examiner

APPARATUS FOR SEISMIC DATA ACQUISITION

CROSS REFERENCE TO RELATED APPLICATIONS

This application is a divisional of U.S. patent application Ser. No. 12/220,518, filed Jul. 25, 2008, now U.S. Pat. No. 7,668,047, which is a divisional of U.S. patent application Ser. No. 10/766,253, filed Jan. 28, 2004, which claims priority to and the benefit of U.S. Pat. No. 7,561,493, filed on May 30, 2003, all of which are hereby incorporated by reference.

BACKGROUND

The present invention relates to the field of seismic exploration. More particularly, the invention relates to a method and apparatus for seismic exploration, and most particularly to a self-contained, land based or marine deployable seismometer system.

Seismic exploration generally utilizes a seismic energy source to generate an acoustic signal that propagates into the earth and is partially reflected by subsurface seismic reflectors (i.e., interfaces between subsurface lithologic or fluid layers characterized by different elastic properties). The reflected signals (known as "seismic reflections") are detected and recorded by seismic receivers located at or near the surface of the earth, thereby generating a seismic survey of the subsurface. The recorded signals, or seismic energy data, can then be processed to yield information relating to the lithologic subsurface formations, identifying such features, as, for example, lithologic subsurface formation boundaries.

Typically, the seismic receivers are laid out in an array, wherein the array consists of a line of stations each comprised of strings of receivers laid out in order to record data from the seismic cross-section below the line of receivers. For data over a larger area and for three-dimensional representations of a formation, multiple single-line arrays may be set out side-by-side, such that a grid of receivers is formed. Often, the stations and their receivers are remotely located or spread apart. In land seismic surveys for example, hundreds to thousands of receivers, called geophones, may be deployed in a spatially diverse manner, such as a typical grid configuration where each line extends for 5000 meters with receivers spaced every 25 meters and the successive lines are spaced 500 meters apart.

Generally, several receivers are connected in a parallel-series combination on a single twisted pair of wires to form a single receiver group or channel for a station. During the data collection process, the output from each channel is digitized and recorded for subsequent analysis. In turn, the groups of receivers are usually connected to cables used to communicate with the receivers and transport the collected data to recorders located at a central location, often called the "dog house." More specifically, when such surveys are conducted on land, cable telemetry is used for data transmission between the individual receivers, the stations and the dog house. Other systems use wireless methods for data transmission so that the individual receivers and stations are not connected to each other. Still other systems temporarily store the data at each station until the data is extracted.

As used throughout this description, "land-based seismic systems" shall include seismic systems utilized in costal transition zones such as shallow water or marshes. With respect to operation of most land-based seismic systems, the prior art generally requires some externally generated control command in order to initiate and acquire data for each shot, cause stored seismic data to be transmitted back to the dog house and cause any other data, such as quality control data, to be transmitted back to the dog house. Thus the seismic receiver units must be either physically connected to the central control recording station or "connectable" by wireless techniques. As mentioned above, those skilled in the art will understand that certain environments can present extreme challenges for conventional methods of connecting and controlling seismic, such as congested or marine environments, rugged mountain environments and jungles or remote desert locations. Difficulties may also arise in instances where the interconnected, hard-wired receiver array must be periodically moved to cover a larger area.

Whatever the case, each type of connection, whether via a physical cable or through wireless techniques, has its own drawbacks. In cable telemetry systems, large arrays may result in large quantities of electrically conductive cabling that are expensive and difficult to handle, deploy or otherwise manipulate, as well as repair and maintain. In hostile environments characterized by extreme or corrosive conditions, such as salt water, hot, sandy deserts or overgrown, damp jungles, costly cable armoring may be required. Furthermore, conventional cabling also requires a physical connection between the cable and the sensor unit. Since it is generally not practical to hard wire strings of receivers to a cable, the more conventional technique is to use external cabling and connectors between strings of receivers and the telemetry cable. This point of the connection between the cable and the sensor is particularly vulnerable to damage, especially in extreme or corrosive environments. Of course, with systems that are physically cabled together, it is much easier to provide power to the stations/units, to synchronize data acquisition with the shot time, to perform quality control checks and to otherwise control the units.

It should be noted that whether for cabled or wireless systems, the seismic recording systems of the prior art separate the receiver package, i.e., the geophones, from the radio control package and/or the recording package of the units to the extent the units provide any on-board recording. It has heretofore been conventional thinking in the prior art that geophone coupling with the earth can be maximized in this way. External cabling is required in these prior art systems to connect the geophone package of a unit with the recording and/or radio telemetry packages of the unit. As such, many of the aforementioned drawbacks that arise from cabling system units together also exist when cabling various package components of an individual unit to one another.

In cases where either wireless technology is utilized or operation of units and their sensors is through pre-programming, control and monitoring of the units and sensors becomes more difficult. For example, ensuring that recording is synchronized with the shot timing is crucial since the individual sensor units are not wired together as described above. Hence the need for accurate on-board clocks as mentioned above. In this regard, activating each unit for sensing and recording at the appropriate time must coincide with the shot. One common prior art technique in this regard is to utilize a command signal sent from the control station to power up the system, initiate transmission of data stored from the previous shot and initiate collection of data for the current shot which is temporarily written into memory until transmitted back to the control station at the time of the next shot.

Ensuring that the units are sufficiently powered has also heretofore been a concern. Many prior art patents have focused on techniques and mechanisms for powering up sensors during data acquisition/recording and powering down the sensors during dormant periods.

A land-based system representative of the prior art is taught in U.S. Pat. No. 6,070,129, which pertains to the compression and distribution of seismic data from a plurality of acquisition units, each unit being suited to acquire, to temporarily store and to compress the data for distributed transmission to a central control and recording station. Each acquisition unit is hard wired to a plurality of distributed seismic geophones/receivers from which the acquisition unit receives data. Each acquisition unit is also disposed to receive operation instructions from the central control and recording station. In one embodiment of the invention, during acquisition of data from a particular shot, partial data from the previous shot is transmitted to the central control and recording station to permit a quality control check and to ensure that the acquisition units are properly working. Data from any given shot may be distributed and transmitted over multiple transmission channels and during successive transmission windows to lessen variation in data flow.

Each of the referenced prior art devices embodies one or more of the drawbacks of the prior art. One drawback to these prior art systems is the need to activate and deactivate the units for recording and operation, including data and quality control transmission. For land-based systems, this generally requires a control signal transmitted via a cable or radio signal from the dog house. However, external control may be undesirable since it requires signal transmission and additional components in the system. Of course, any type of control signal cabling for transmission of electrical signals is undesirable because it adds a level of complexity to the handling and control of the unit and requires external connectors or couplings. Such cabling and connectors are particularly susceptible to leakage and failure in extreme environments, whether the corrosive environment of transition zone water or the high temperature, corrosive environments of the desert.

A similar problem exists with units that utilize external electrical wiring to interconnect distributed elements of the unit, such as is taught in U.S. Pat. No. 5,189,642 and similar devices where the geophone package is separate from the electronics package. Furthermore, to the extent the electronics of a system are distributed, the likelihood of malfunction of the system increases.

Many of the prior art systems also use radio telemetry rather than recording data on-board the unit, to collect the data. Such systems, of course, have limitations imposed by the characteristics of radio transmission, such as radio spectrum license restrictions, range limitations, line-of-sight obstructions, antenna limitations, data rate limitations, power restrictions, etc.

Thus, it would be desirable to provide a land-based seismic data collection system that does not require external communication/power cabling, either from the control station or on the seismic data collection unit itself between unit components. Likewise, the unit should record and otherwise operate without any type of external control signal. In other words, the unit should operate on a "drop and forget" basis. Likewise, the device should be easily serviced without the need to open the device to perform activities such as data extraction, quality control and power replenishment. The device should also be designed to withstand the corrosive, extreme environments which are often encountered in seismic exploration. The device should also permit quality control data sent back by radio to determine if the remote units of the system are operating properly without the need for control signals or tying the quality control data transmission to a shot cycle.

SUMMARY

The present invention provides a land-based system for collecting seismic data by deploying multiple, continuous operating, autonomous, wireless, self-contained seismic recording units or pods Seismic data previously recorded by the pod can be retrieved and the pod can be charged, tested, re-synchronized, and operation can be re-initiated without the need to open the pod.

More specifically, the unit is self-contained such that all of the electronics are disposed within or on the case, including a geophone package, a seismic data recording device and a clock. A power source is either contained within the case, or may be attached externally to the case. The clock may be attached to a gimbaled platform having multiple degrees of freedom to minimize the effects of gravity on the clock.

In one embodiment of the invention, the clock is a rubidium clock. The rubidium clock is much less susceptible to temperature or gravitational effects or orientation of the unit.

In another embodiment, the unit includes a crystal clock and the crystal clock is corrected for the effects of aging on the crystals.

The power source is preferably rechargeable batteries disposed within the unit's case that can operate in a sealed environment, such as lithium ion batteries. Alternatively, the power source may incorporate a fuel cell or solar cell attached to the unit's case.

The self-contained seismic units may include a tilt meter within the unit's case. While tilt meter data is utilized by the invention for several different inventive functions, such as the above-mentioned crystal clock correction procedure, none of the prior art seismic units have incorporated a tilt meter within a seismic unit comprising a single, self-contained package. Rather, such prior art units have separate attached packages housing the separate components. For example, a prior art unit may have one package that houses a tilt meter while a separate package houses a geophone.

Of course, a tilt meter may also be used to determine the vertical orientation of a unit so that corresponding seismic data can be correct accordingly. One aspect of the invention is to obtain and utilize tilt meter data in a time continuous fashion. Prior art units typically determine a unit's vertical orientation using means external to said case and orientation data are generated therefrom only once at the beginning of seismic recording. To the extent orientation corrections have been made to seismic data acquired with such prior art units, the corrections are based only on the initial orientation of the unit. Yet it has been observed that the orientation of a seismic unit may change over the course of deployment as the unit is subject to external forces which have been known to range from water currents to kicking by cows. Thus, in the invention, vertical orientation data is measured by the tilt meter as a function of time so that seismic data can be correspondingly corrected.

With respect to corrections for tilt, timing or similar data that could effect the accuracy of the collected seismic data, all of the prior art devices make such corrections at a processing center. None of the prior art devices make such corrections on-board the unit while it is deployed. Thus, one method of the invention is to make such corrections on-board the unit while it is deployed.

The self-contained seismic units of the invention may also include a compass. Compass data may be used to provide directional frame of reference data for each individual unit relative to the frame of reference for the overall survey. Much like a tilt meter, the prior art has not incorporated a compass into a single, self-contained package housing all the components of the seismic acquisition unit. To the extent a compass has been incorporated in prior art seismic units, the compass has been housed in a separate package from other components, such as the geophones. Of course, many prior art units do not determine a unit's directional orientation at all and thus do not incorporate a compass. Rather, only vertical orientation data is acquired using a tilt meter. When the self-contained multidirectional sensor unit of the invention incorporates both a compass used in conjunction with a tilt meter, the specific three dimensional orientation of the unit can be determined. None of the prior art devices incorporate the combination of both a compass and a tilt meter on board a single, self-contained unit package, particularly for this function.

In another aspect of the invention, the unit is activated prior to transportation out to the field and deactivated once retrieved, such that it is continuously acquiring data from before the time of deployment to after the time of retrieval. Likewise in one embodiment, the unit begins recording data prior to deployment. Systems that are activated and begin recording before deployment are thereby stabilized prior to the time when signal detection is desired. This minimizes the likelihood that an altered state in electronics operation will disrupt signal detection and recording or effect clock synchronization.

In another aspect of the invention, the seismic data recording device includes wrap around memory and continuously records, even when not in use. This obviates the need for initiation or start instructions, ensures that the unit is stabilized at the desired recording times, and serves to back-up data from prior recordings until such time as the prior data is written over. As long as the clock is synchronized, such a recording device is ready for deployment at any time. Furthermore, routine operations such as data collection, quality control tests and battery charging can take place without interrupting recording.

Continuous operation is also desirable as an element of an inertial navigation system incorporated in the seismic unit and used to measure the unit's x, y and z position information as the unit is transported from an initial position, such as a storage location, to a deployment position out in the field. An inertial navigation system may include sensors, such as accelerometers to track x, y and z position information, as well as a compass and tilt meter to determine orientations. Such a system can be used to determine the deployment location of a unit in the field.

Each unit may include a communications portal to permit the unit to interface with a master control station via the communications portal, typically after the unit has been retrieved from deployment. Through the portal, information recorded on the unit can be downloaded, the unit batteries can be recharged, quality control checks on the unit can be conducted, recording can be re-initiated and the unit can be reactivated without the need to open or disassemble the unit.

Each unit may include a unique identification means, such as a radio frequency identification (RFID) tag or similar identification indicia to permit tracking of the individual units as they are handled. Likewise, each unit may include a Global Positioning System ("GPS"). Since the individual units are self-contained, the location information, in association with the identification indicia allows the units to be randomly handled and stored, but permits data from multiple units to be retrieved and sequentially ordered according to the location of the unit during a shot cycle. Thus, the need to keep units in sequential order is obviated. Units that might have been adjacent one another on a receiver line need not be retrieved in order or stored next to one another.

DESCRIPTION OF THE PREFERRED EMBODIMENTS

In the detailed description of the invention, like numerals are employed to designate like parts throughout. Various items of equipment, such as fasteners, fittings, etc., may be omitted to simplify the description. However, those skilled in the art will realize that such conventional equipment can be employed as desired.

Figure 1:
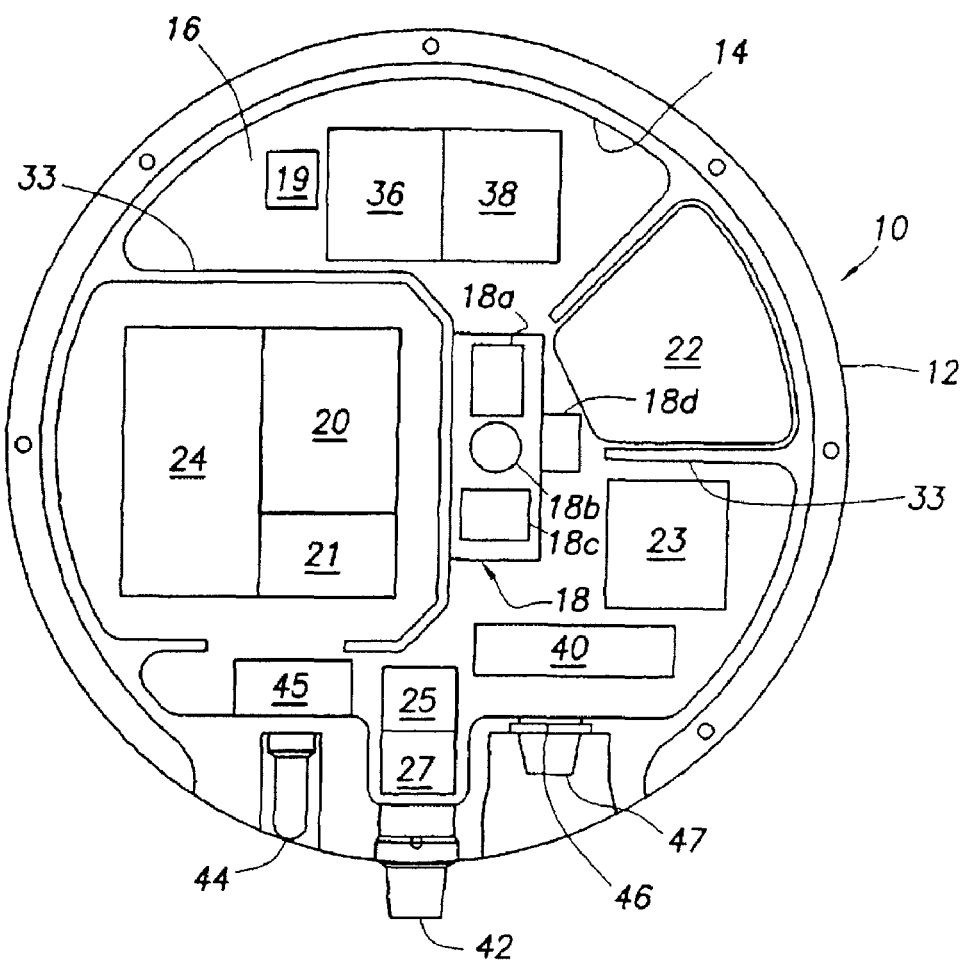
FIG. 1 is a cut-away top view of the seismic recorder unit of the current invention.

With reference to FIG. 1, there is shown a seismic data collection system or pod 10 of the invention. Pod 10 is comprised of a case 12 having a wall 14 defining an internal, compartment 16. Preferably, case 12 is sealed to prevent water, dust or other debris from migrating into compartment 16. Disposed within compartment 16 is at least one geophone 18, a clock 20, a power source 22, a control mechanism 23 and a seismic data recorder 24. In the embodiment, pod 10 is self-contained such that power source 22 meets all of the power requirements of pod 10. Likewise, control mechanism 23 provides all control functions for pod 10 eliminating the need for external control communications. In an alternative embodiment, power source 22 may be attached externally to case 12 as described below.

Those skilled in the art will appreciate that pod 10 is a self-contained seismic data collection system which requires no external communication or control in order to record seismic signals. It will be further noted that geophone 18 is internally mounted within pod 10 and thus requires no external wiring or connection. It has been determined that utilizing a compact case and positioning geophone 18 adjacent the casing wall, geophone 18 can be effectively coupled to the earth such that seismic data transmitted through pod 10 to geophone 18 is not corrupted by interference. Unless specifically indicated, all references to geophones utilized in the invention include conventional geophones as well as other known devices for detecting seismic wave activity or directional sensors, including without limitation, accelerometers, and references to accelerometers likewise include other directional sensors, including, without limitation, geophones.

In another embodiment of the invention, it has been found advantageous to utilize four geophones 18a, 18b, 18c, 18d positioned in a tetrahedral configuration such that each geophone measures data in multiple planes. In a standard three dimensions configuration, three geophones are positioned 90° apart from each other and each geophone measures signal in a single x, y or z plane. In a four geophone configuration, the geophones are oriented perpendicular to the plane of the tetrahedral faces so that each geophone measures portions of multiple planes in the x, y, z coordinate system. For example, one geophone may measure seismic data in the x-plane and z-plane. Geophone configurations of four or more geophones are desirable because they provide for redundancy in the seismic unit in the event of failure of a geophone in a particular plane.

Another embodiment of the invention utilizes a geophone 19 disposed within pod 10 as a driven power source to gauge the degree of coupling of pod 10 with the earth. Those skilled in the art will understand that the physical coupling between a seismic unit and the earth has become one of the primary concerns in the seismic data collection industry. The invention incorporates a driven geophone to test this coupling. Specifically, rather than simply utilizing a geophone to detect energy, it has been found that a geophone can be utilized as a power source to introduce energy, i.e., vibrations, into pod 10. In other words, a geophone within pod 10 can be driven thereby causing pod 10 to shake. Such a driven geophone used in conjunction with the other geophones on board can be used to determine the degree of physical coupling between pod 10 and the earth. If pod 10 is well coupled with the earth, the vibrational energy generated by the geophone will be transmitted through the pod's coupling structure, such as spike 52, and dispersed within the earth. In such case, the other on-board geophones used for detecting vibrational energy would detect energy at a first low level. On the other hand, if there is not good coupling between pod 10 and the earth, the generated vibrational energy will not be transmitted into the earth. In such case, the other on-board geophones used for detecting vibrational energy would detect energy at a second level much higher than the first level.

None of the prior art seismic units teach an on-board system to test the degree of coupling between the unit and the earth. This is true in part because none of the prior art devices comprise a self-contained seismic recording unit as described herein. Rather, the prior art units separate the geophone package from the electronics of the rest of the unit. In such case, it would be impractical to include a power source, along with the electronics to control the power source, in a distributed, separate geophone package. The above described system is desirable because it can be utilized in a system with as few as two geophones, where one geophone functions as an energy source and the other geophone functions as an energy receiver. Further, such a system permits the use of at least one geophone for a dual purpose, i.e., the geophone can be used to generate energy during coupling tests but can otherwise be used in a detection mode to detect seismic during seismic exploration. Of course, to the extent a geophone is dedicated only for use as an energy source, it need not be positioned with the other seismic detection geophones in the unit. Thus, for example, a three geophone package to measure seismic energy in the x, y and z planes might be positioned within pod 10 to maximize their ability to detect seismic energy, such as adjacent the base of pod 10, while a forth geophone dedicated as an energy source might be positioned within pod 10 to maximize distributions of vibrational energy within pod 10, such as near the top of pod 10.

In one important aspect of the invention, clock 20 is a rubidium clock. Heretofore, rubidium clocks have not been used in seismic exploration due in part to the expense when compared to traditional crystal driven clocks. However, because the pod 10 of the invention is intended to operate effectively independent of its orientation, it is necessary to utilize a clock that in not susceptible to orientation effects which can inhibit operation of traditional prior art crystal clocks. Furthermore, rubidium clocks are less susceptible to temperature and gravitational effects that can inhibit operation of prior art clocks.

Gravitational effects on clock 20 can also be minimized through use of a mechanically gimbaled platform 21 that rotates to maintain clock 20 in a more optimal orientation for performance. Preferably, gimbaled platform 21 can rotate in at least three degrees of freedom, although gimbaled platform 21 may have fewer degrees of freedom and still be utilized for the desired purpose. This is an improvement over prior art seismic units which have not utilized gimbaled clock platforms at all.

Unit 10 may also include tilt meter 25. Tilt meter 25 and the data generated therefrom may serve several different purposes, including without limitation, correction of clock data or for vertical orientation determination. Furthermore, such tilt meter data is measured as a function of time. Thus, preferably, the tilt meter data is associated with a data set in a time continuous fashion such that a data set generated at a particular time is associated with tilt meter data generated at that same time. While prior art seismic units have not incorporated tilt meters in a single, self-contained multidirectional sensor unit, to the extent orientation corrections have been made to seismic data generated from prior art units, such corrections have been made from orientation data generated at the beginning of a shot cycle to correct all of the seismic data generated during the shot cycle. This can result in inaccuracies to the extent the orientation of the seismic unit is altered during a shot cycle or deployment period. In one embodiment, all such tilt meter corrections are made on-board the unit, preferably in real time.

In this same vein, unit 10 may include a compass 27, which, heretofore has not been utilized in a single, self-contained multidirectional sensor unit. Compass 27 and the data generated therefrom may be used to provide directional frame of reference data for each individual unit relative to the frame of reference for the overall survey. Furthermore, when used in conjunction with tilt meter data, the specific three-dimensional orientation of a unit can be determined such that seismic data accuracy can be further improved.

Power source 22 is preferably a lithium ion battery. To the extent prior art seismometer systems have utilized on-board batteries, as opposed to external cabling to supply power, the prior art batteries have been lead-acid, alkaline or non-rechargeable batteries. None of the prior art systems have utilized lithium ion batteries. Furthermore, because of the sealed, self-contained nature of the pod of the invention, it is desirable to utilize a battery that does not vent fumes, such as a lithium ion type battery. In an alternative embodiment, power source 22 may incorporate a fuel cell or solar cell attached externally to case 12. Of course, while such power source components are not contained within case 12, for purposes of the invention, pod 10 is still self-contained in the sense that it operates as a stand alone unit without communication, control signals or power from a source removed from the pod.

Figure 2:
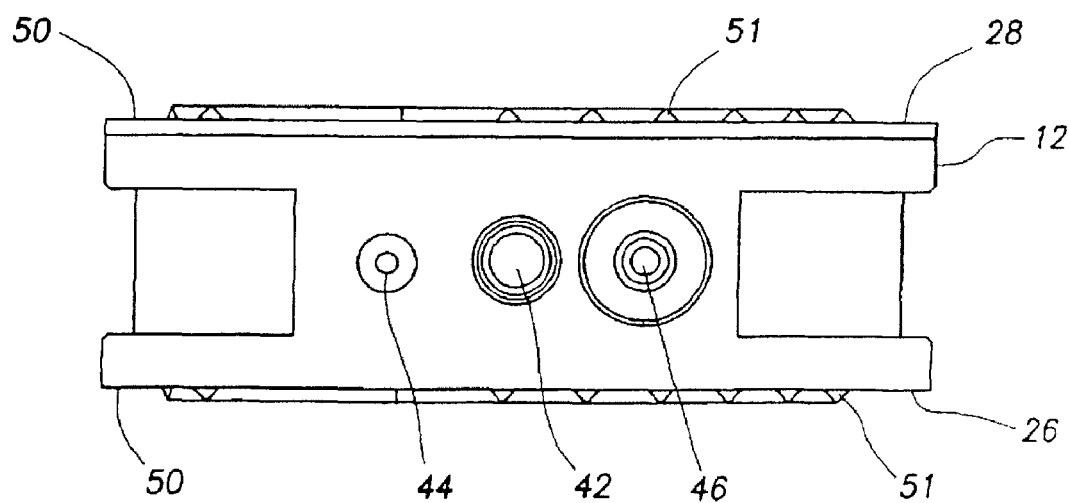
FIG. 2 is a front side view of the unit of FIG. 1.
Figure 4:
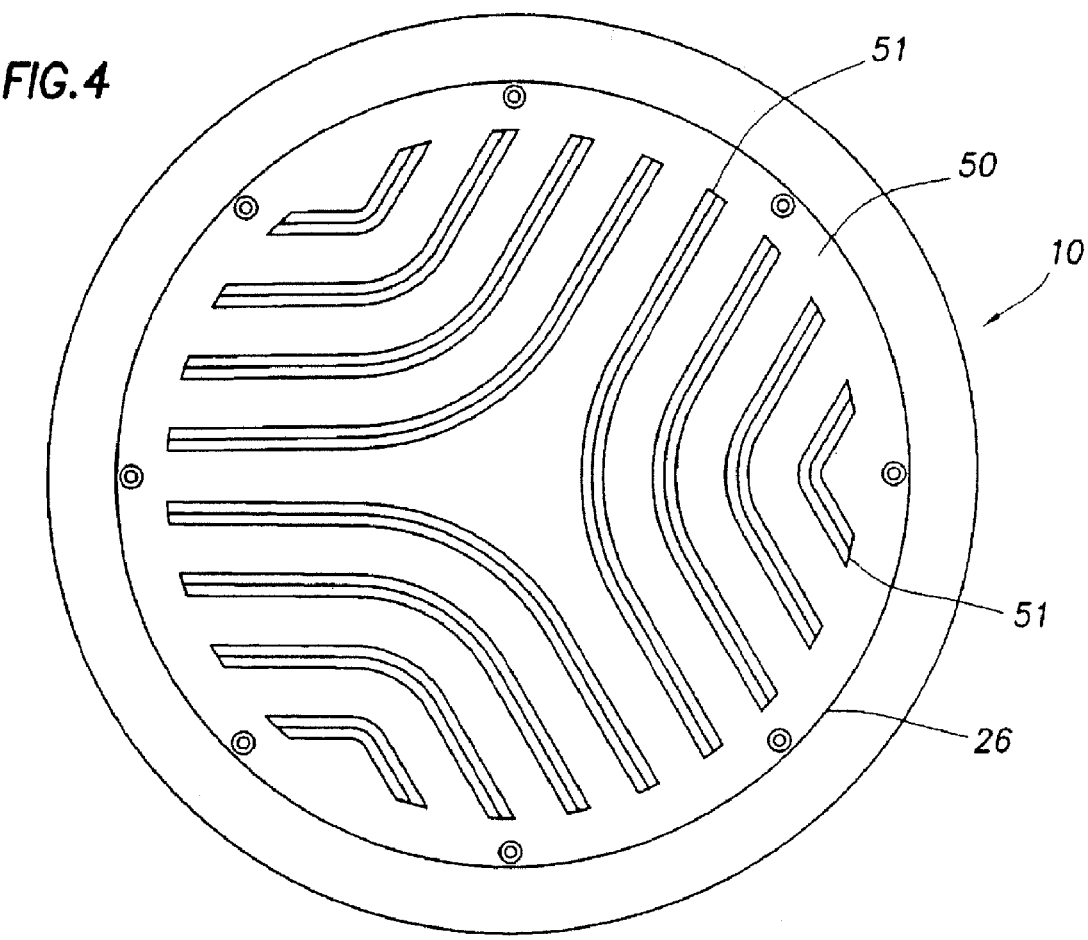
FIG. 4 is a top view of the unit of FIG. 1.
Figure 3:
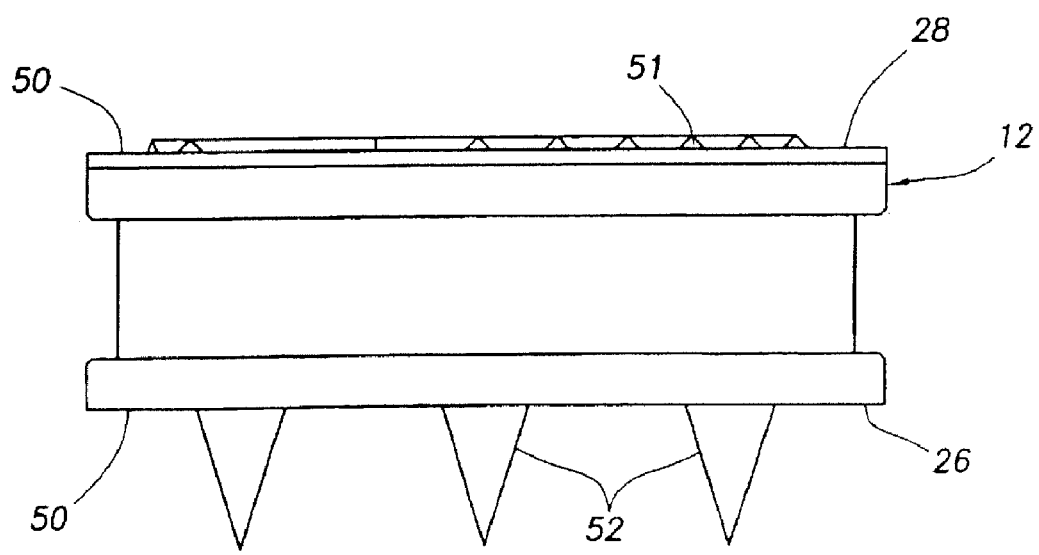
FIG. 3 is a back side view of the unit of FIG. 1.

In FIGS. 2, 3, and 4, the exterior of pod 10 is shown. Wall 14 defining case 12 may include a first plate 26 and a second plate 28 jointed together along their peripheries by a portion of wall 14. Each plate defines an external surface 50. While plates 26 and 28 are disk shaped in the illustrated embodiment such that pod 10 has an overall wheel shape, pod 10 can be of any shape so long as it functions in accordance herewith. The external surface 50 may be provided with projections 51, such as ridges or grooves, to enhance coupling between pod 10 and the earth. In the embodiment shown in FIG. 4, the projections 51 form a chevron pattern on surface 50. More pronounced projections, such as spikes 52, may be provided to prevent movement of pod 10 once it is deployed and improve coupling.

Each unit may include a unique identification means, such as a radio frequency identification (RFID) tag 40 or similar identification indicia to permit tracking of the individual units as they are handled during deployment and retrieval. Likewise, each unit may include a GPS transducer 42 which permits the unit's location to be determined (to the extent a unit is deployed in a location in which GPS is effective).

FIG. 1 also shows a radio antennae 44 which is communication with a radio unit 45 disposed within case 12.

A connector 46 for permitting communication with pod 10 may also be disposed on case 12. Such communication may occur when pod 10 is in storage at a central command unit or even to the extent data is simply retrieved by an operator who travels out to the pod's deployment location. Connector 46 may be a standard pin connector or may be an infrared or similar connector that requires no hard wiring in order to communicate with pod 10. Via connector 46, pod 10 may be serviced without removing one of plates 26, 28 or otherwise opening case 12. Specifically, connector 46 permits quality control tests to be run, recorded seismic data to be extracted, clock 20 to be synchronized and power source 22 to be recharged. A sealing connector cap 47 may also be provided to protect connector 46. For under water uses or other wet environments, connector cap 47 is preferably water tight. Utilizing such a connector cap 47, connector 46 may be any standard connector that satisfies the desired functions of the pod and need not be of the type normally required of external connectors subjected to extreme or corrosive environments.

One function of the seismic data recording unit of the invention is the continuous operation of the unit. In this aspect of the invention, data acquisition is initiated prior to positioning of the unit on the earth's surface, i.e., prior to deployment. For example, units may be activated at a central location prior to trucking them out to the field. Systems that are activated and begin acquiring data prior to deployment are thereby stabilized prior to the time synchronization and seismic data recording are desired. This minimizes the likelihood that an altered state in electronics operation will have an effect of data integrity.

In a similar embodiment, data recording is initiated prior to positioning along a receiver line. Again, this permits units to stabilize prior to the time synchronization and seismic data recording are desired. To this end, one component of system stabilization is clock stabilization. Of the various components of the system, it is well known that clocks typically take a long time to stabilize. Thus, in one embodiment of the invention, whether the unit is continuously detecting data or continuously recording data, the clock always remains on.

In either of the preceding two methods, the unit can be utilized in several cycles of deployment and retrieval without interrupting the continuous operation of the unit. Thus, for example, prior to deployment, recording is initiated. The device is deployed, retrieved and redeployed, all while recording is continued. As long as memory is sufficient, this continuous recording during multiple cycles of deployment and redeployment can be maintained.

In this regard, to the extent the seismic data unit includes wrap around memory, it can continuously record even when not in use in seismic detection. Thus, in addition to the advantages described above, initiation or start instructions become unnecessary. Further, continuous recording utilizing wrap around memory functions as a back-up for data acquired from prior recordings until such time as the prior data is written over. An additional advantage is that the device is ready for deployment at any time as long as the clock is synchronized.

To the extent recording is continued after a unit has been retrieved, routine operations such as data retrieval, quality control tests and battery charging can take place without interrupting recording. One benefit of such a system is that the device can be utilized to record quality control test data rather than seismic data when conducting quality control tests. In other words, the data input changes from seismic data to quality control data. Once quality control is complete, the device may resume recording seismic data or other desired data, such as data related to position and timing.

While "continuous" unit operation has been described temporally in one embodiment as setting operation parameters to initiate operation prior to deployment of the unit, for purposes of the meaning of "continuous" as used herein, the time period of unit operation may simply be initiated prior to a shot and continue through a series of shots or shot cycles and may also include continued recording of a unit through a series of shots or shot cycles. In another embodiment, while continuously operating, parameters may be set to intermittently record at pre-set, specified times.

The above described continuous operation of the seismic units of the invention is particularly suited for use with a unique position determination method of the invention. Specifically, a unit's x, y and z position information is recorded as the unit is transported from an initial position, such as a storage location, to a deployment position out in the field. The positional information may be determined using an inertial navigation system that measures movement in each of the x, y and z dimensions as well as angular movement around each x, y and z axis. In other words, the system measures the six degrees of freedom of the unit as it travels from the initial location to the deployment position, and utilizes such measurement information to determine the location of the deployment position. In the preferred embodiment, such x, y and z dimensional information can be determined utilizing accelerometers. Angular orientation, i.e., tilt and direction, information can be determined utilizing a tilt meter and a compass or other orientation devices, such as gyroscopes. In one embodiment of the invention, three accelerometers and three gyroscopes are utilized to generate the inertial navigation data used to determine the unit's deployment position.

In any event, by combining accelerometer and the tilt and direction orientation information as a function of time with the unit's initial position and velocity at the time of initial deployment, the travel path of the unit and hence the deployment location of the unit, can be determined. Time sampling will occur at appropriate intervals to yield the accuracy needed. Time sampling between various measurement components may vary. For example, data from the compass, used to measure direction, and the tilt meter, used to measure tilt, may be sampled more slowly than data from the accelerometers. Heretofore, no other seismic unit has utilized one or more accelerometers to determine location in this way. In this regard, the method and system replaces the need to determine location utilizing other techniques, such as through GPS or the like.

Because a unit is already recording data at the time of its transportation to and deployment in the field, x, y and z positional information is easily recorded on the unit and becomes part of the unit's complete data record.

To the extent clock 20 is a crystal clock, one method of the invention is to make clock corrections to compensate for aging of the clock's crystals. Specifically, it has been determined that seismic data can be effected by the aging of crystals within a unit's crystal clock.

Typically, the aging curve for a given crystal will be logarithmic for an initial period of time and gradually transition into a more linear curve over an extended period of time. As such, the curve has a significant slope at the beginning of the aging process and a more linear, flat slope at as the aging process continues over time. In this regard, a seismic unit will tend to have more crystal aging at the beginning of a deployment period. In any event, prior to deployment, a characterization curve for a clock's crystal can be determined by plotting crystal aging vs. time over an extended period of days, such as fifteen to twenty days. In operation, the crystal frequency can be measured at the time of deployment and at the end of deployment. Utilizing this information, the applicable portion of the aging curve can be identified and the seismic data collected over the period can be adjusted accordingly.

Of course, one process to minimize the effects of crystal aging is to preage a clock's crystals prior to deployment of the unit. This is somewhat equivalent to initiating operation of the unit prior to deployment in order to permit the unit to stabilize as described above. By preaging crystals, the exponential portion of the characterization curve can be avoided such that the correction information is simply linear in nature. In other words, presaging stabilizes the aging slope and simplifies seismic data corrections for crystal aging.

In this regard, each time a seismic unit is powered off and back on, the clock's crystals must be re-characterized. However, over multiple cycles of operation, the linear portion of the aging curve, i.e., crystal aging stabilization, is reached more quickly. Notwithstanding the foregoing, whether crystals are preaged or not, none of the prior art devices or seismic data processing techniques correct for crystal aging as described herein.

While certain features and embodiments of the invention have been described in detail herein, it will be readily understood that the invention encompasses all modifications and enhancements within the scope and spirit of the following claims.

What is claimed is:

1. A seismic data collection unit comprising:
   a. a fully enclosed, single case formed of a housing, said case having a wall defining an internal compartment within said housing;
   b. at least one geophone internally fixed within said housing;
   c. a clock disposed within said housing;
   d. a power source disposed within said housing; and
   e. a seismic data recorder disposed within said housing;
   f. wherein each of said elements b-e include an electrical connection and all electrical connections between any elements b-e are contained within said housing; and
   g. wherein said geophone is coupled to said seismic data recorder to permit seismic signals detected by said geophones to be recorded on said seismic data recorder,
   h. wherein the single case comprises a first plate having a first periphery and a second plate having a second periphery, wherein the plates are joined along their peripheries by a circular wall.

2. The unit of claim 1, wherein said unit is self contained and requires no external communications or controls during recording.

3. The unit of claim 1, wherein the case is watertight.

4. The unit of claim 1, wherein the at least one geophone is disposed adjacent a plate.

5. A seismic data collection unit comprising:
   a. a fully enclosed, single case formed of a housing, said single case having a first plate having a first periphery and a second plate having a second periphery, wherein the plates are joined along their peripheries by a circular wall, said wall defining an internal compartment within said housing;
   b. at least one geophone internally fixed within said housing;
   c. a clock disposed within said housing;
   d. a power source; and
   e. a seismic data recorder disposed within said housing.

6. The unit of claim 5, wherein said unit is self contained and requires no external communications or controls during recording.

7. The unit of claim 5, wherein , wherein each of said elements b-c include an electrical connection and all electrical connections between any elements b-c are contained within said housing.

8. The unit of claim 5, wherein the power source includes a fuel cell attached to the case.

9. The unit of claim 5, wherein the power source includes a solar cell attached to the case.

10. The unit of claim 1, wherein the case defines an external surface, and the external surface is provided with ridges to enhance coupling of unit with the earth.

11. The unit of claim 1, wherein the case defines an external surface, and the external surface is provided with at least one spike to enhance coupling of unit with the earth.

12. The unit of claim 1, further comprising
   a. three geophones disposed within said case; and
   b. a compass.

13. The unit of claim 1, wherein the geophone is a multi-component geophone capable of measuring seismic signals in at least two directions angularly oriented to one another.

14. The unit of claim 1, further comprising a GPS location transducer.

15. The unit of claim 1, further comprising a radio unit.

16. The unit of claim 1, further comprising an external connector in electrical communication with at least one of said geophone, clock, power source and seismic recorder, said connector extending through the wall of said case and disposed within said wall so as to be set in from the external surface of said wall.

17. The unit of claim 16, further comprising a water tight, pressure resistant cap disposed over said external connector.

18. The unit of claim 1, further comprising an internal control mechanism for controlling all functions of the unit while deployed.

19. The seismic data collection unit of claim 5, further comprising:
   a. at least four seismic data geophones disposed within said case, wherein at least three of said geophones are disposed adjacent one another and at least one geophone is disposed in a location within said case removed from said other geophones.

20. The seismic data collection unit of claim 5, further comprising a case in which the at least four seismic data geophones are disposed, wherein said at least three geophones are disposed in said case to maximize detection of seismic energy and said at least one geophone is disposed in said case to maximize vibration of said case by said removed geophone.

21. A seismic data collection unit comprising:
   a. a fully enclosed, single case formed of a housing, said single case having a first plate having a first periphery and a second plate having a second periphery, wherein the plates are joined along their peripheries by a circular wall, said wall defining an internal compartment within said housing;
   b. at least one geophone internally fixed within said housing;
   c. a clock disposed within said housing;
   d. a power source disposed within said housing;
   e. positional electronics disposed within said housing;
   f. orientation electronics disposed within said housing; and
   g. a seismic data recorder disposed within said housing;
   h. wherein each of said elements b-g include an electrical connection and all electrical connections between any elements b-g are contained within said housing.

* * * * *